US008913170B1

(12) United States Patent
Baldwin (10) Patent No.: US 8,913,170 B1
(45) Date of Patent: Dec. 16, 2014

(54) CAMERAS FOR COMPUTING DEVICES

(75) Inventor: Leo B. Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 217 days.

(21) Appl. No.: 13/531,263

(22) Filed: Jun. 22, 2012

(51) Int. Cl.
*H04N 5/222* (2006.01)
*H04N 5/225* (2006.01)

(52) U.S. Cl.
USPC ................................... 348/333.01; 348/374

(58) Field of Classification Search
CPC . H04N 5/2251; H04N 5/2252; H04N 5/2253; H04N 5/23293
USPC ..................................... 348/333.01, 373–376
See application file for complete search history.

(56) References Cited

U.S. PATENT DOCUMENTS

| 7,688,532 | B1 * | 3/2010 | Lin et al. ................... 359/819 |
| 7,760,444 | B2 * | 7/2010 | Iyama ......................... 359/749 |
| 2004/0189794 | A1 * | 9/2004 | Rambo et al. ............ 348/14.16 |
| 2008/0291297 | A1 * | 11/2008 | Watanabe et al. ......... 348/240.3 |
| 2011/0050988 | A1 * | 3/2011 | Yano et al. .................. 348/374 |

OTHER PUBLICATIONS

Andrew Bookholt, "iPad 2 Wi-Fi EMC 2415 Front Facing Camera Replacement", retrieved from http://www.ifixit.com/Guide/iPad+2+Wi-Fi+EMC+2415+Front+Facing+Camera+Replacement/5417 on Mar. 22, 2014.*
"iPad 2 Wi-Fi EMC 2415 Teardown", retrieved from http://www.ifixit.com/Teardown/iPad+2+Wi-Fi+EMC+2415+Teardown/5071 on Mar. 22, 2014.*
iPad 2—Wikipedia, retrieved from http://en.wikipedia.org/wiki/IPad_2 on Mar. 22, 2014.*

* cited by examiner

*Primary Examiner* — Timothy J Henn
(74) *Attorney, Agent, or Firm* — Novak Druce Connolly Bove + Quigg LLP (57) ABSTRACT

The visible presence of one or more cameras of a computing device can be minimized or otherwise reduced using a aperture. A front aperture can be used with one or more cameras, where the piece providing the aperture can be colored to match a color of a surrounding portion of the device, such as a portion of a display window or cover glass of the device. The aperture can enable the associated camera to capture light passing through the aperture, while hiding the camera from the view of the user to the extent practical. In cases where the user might want to know where to look, one or more indicia can be provided by the device to notify the user of the location of the camera(s).

21 Claims, 5 Drawing Sheets

CAMERAS FOR COMPUTING DEVICES

BACKGROUND

Computing devices are continually offering additional processing capacity and functionality. In at least some cases, components such as additional cameras are being provided to enable stereoscopic imaging, imaging from different sides of a computing device, and other such functionality. In many cases, these cameras are relatively large, particularly with respect to the size of small portable devices such as smart phones, and adding multiple such components can take up a substantial amount of real estate on the device, or even cause the size of the device to increase in order to accommodate the components. Further, one of the key selling points of many of these devices is the aesthetic appeal, and having a number of obvious cameras or other such elements can decrease the aesthetics of the device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to including cameras on an electronic device. In particular, various embodiments utilize an aperture, such as a pinhole aperture, with at least one device camera in order to at least reduce the visibility of the camera from the perspective of a user. In at least some embodiments, an aperture can be positioned relative to an opening in a coating or colored layer in order to create a relatively small visible opening in the layer. A camera and/or camera optics can be positioned relative to the aperture in order to enable the camera to capture light passing through the aperture, without visibly exposing an entire front portion of the camera to a viewer of the electronic device. In various embodiments, the aperture can be connected to a camera, camera optics, a camera lens train, a camera module, a cover glass, a front window, or a device panel, among other such options. The aperture can be a physical element, such as a disc or washer-type element with an appropriately sized opening, or can take the form of an opening in a paint, deposited coating, or other material layer, among other such options.

Various other functions and advantages are described and suggested below as may be provided in accordance with the various embodiments.

Figure 1:
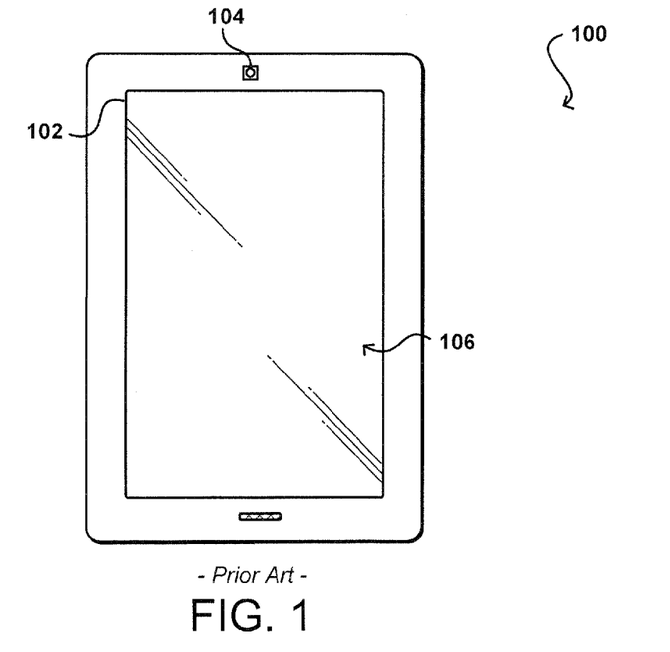
FIG. 1 illustrates a computing device with a camera of the prior art.

FIG. 1 illustrates an example computing device 100 of the prior art. In this example, the device includes a display screen 102 for displaying content and a camera 104 for capturing images or video of a user of the device. As can be seen, the camera 104 takes up a significant amount of space outside the display screen 102, which causes the casing portion 106 of the device to be relatively large. Further, the camera 104 is obviously visible and, thus, can distract from the aesthetic design of the device.

Figure 2:
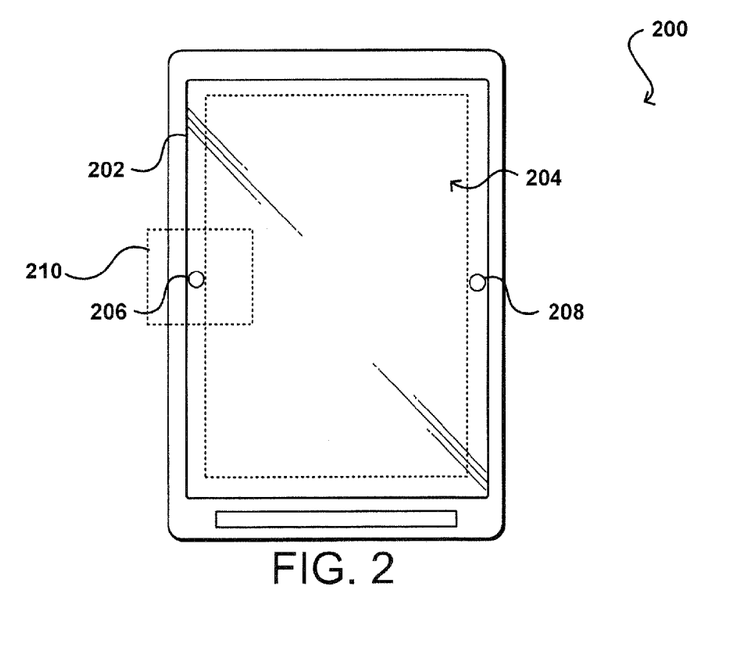
FIG. 2 illustrates an example computing device including a pair of cameras with front pinhole apertures in accordance with various embodiments.

FIG. 2, on the other hand, illustrates a computing device 200 wherein a pair of stereoscopic cameras 206, 208 are included in the device in such a way that the aesthetic design of the device is substantially maintained, and the useful portion of the device can be increased, among other such advantages. Although a portable computing device (e.g., a smartphone, tablet computer, or electronic book reader) is illustrated, it should be understood that any appropriate computing device can utilize aspects of the various embodiments as well, where those devices can include desktop computers, notebook computers, smart televisions, set-top boxes, smart glasses, video game consoles, and the like. Further, the device can include any appropriate number of cameras of any time and at any appropriate location on the device.

In this example, the computing device includes a cover glass element 202 (or display window, etc.) that overlies an active display element 204 (e.g., pixel region) of the computing device, such as may include an LCD or OLED display as known for such purposes. Each of the front-facing cameras 206, 208 has been positioned behind the cover glass 202 but outside the area of the active display element 204. Such a location enables the cameras to be less visible than when placed on the device case or housing, and enables the housing or casing to be thinner as the cameras are contained underneath the cover glass 202. In at least some embodiments, the cover glass can extend to the edges of the device, which can further improve the aesthetics while reducing device thickness. The backside of the cover glass 202 in at least some embodiments can be painted or otherwise covered with a material, such as by depositing or evaporating a flat or glossy black material, in order to provide the desired appearance. In at least some embodiments, such a "masked" area is generated by placing a removable mask layer on the glass before depositing the material, while in other embodiments a portion of the material layer can be removed after deposition, among other such options. Near the location of each of the cameras, an opening can be created in the material layer in order to enable the camera to capture light from outside the device. In order to further minimize the visible size of the camera from outside the device, a pinhole aperture can be positioned at each opening, where the "wall" or physical portion of the aperture facing the cover glass can be painted to match the material layer, such that the only visible portion of the camera is what is exposed by the pinhole opening. In at least some embodiments, a separate pinhole aperture is used rather than forming the pinhole aperture from the material layer in order to assist with alignment issues of the camera with respect to the pinhole aperture.

Figure 3A:
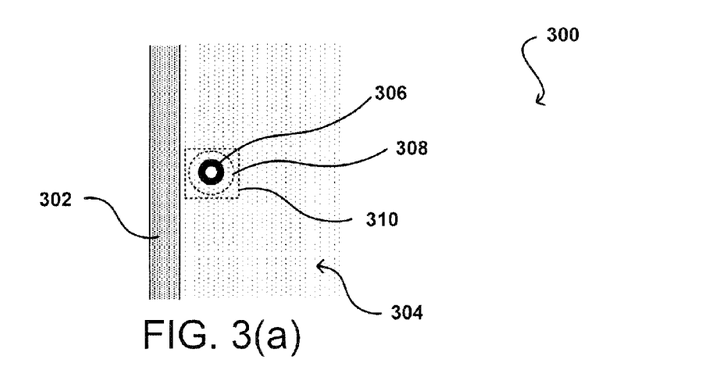
FIGS. 3(a), 3(b), 3(c), and 3(d) illustrate example views of pinhole apertures that can be utilized in accordance with various embodiments.

FIG. 3(a) illustrates an exploded view 300 of a portion 210 of the computing device illustrated in FIG. 2. In this example a pinhole aperture 306 can be seen to be positioned within a cover glass region 304 of the device, which is inside the outer device casing 302. As illustrated, the aperture 306 in this example is substantially adjacent to the back of the cover glass 304, with the optics or lens(es) 308 of the camera being behind the aperture 306, and the camera sensor 310 being behind the lens(es). As known for such purposes, the lenses can be made out of any appropriate transparent and/or translucent material, such as a glass or plastic, and can be of any appropriate shape or design, such as a spherical or aspherical shape. In at least some embodiments, the lenses can include various diffractive elements and/or holographic elements as well. As illustrated, the only visible portion of the camera will be the opening in the aperture 306, which is substantially smaller than the lens 308 of the camera, which in conventional devices might be fully exposed. Such an approach enables the camera to capture images while minimizing the impact on the aesthetics of the device.

Figures 3B, 3C:
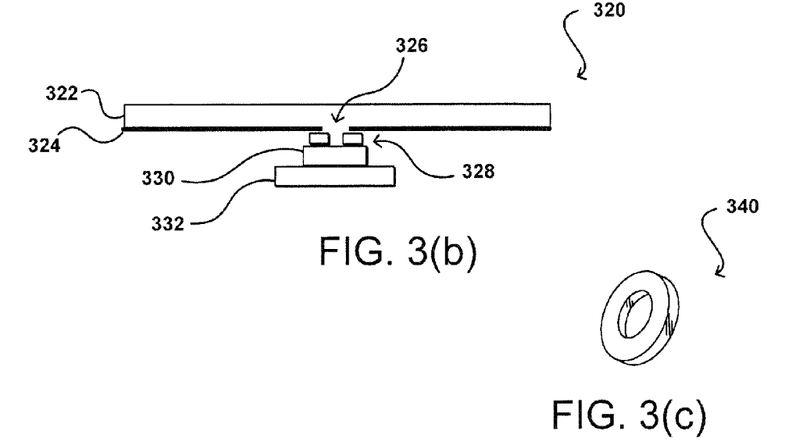

FIG. 3(b) illustrates a side, cross-sectional view 320 of the portion of the computing device illustrated in FIG. 3(a). In this view, it can be seen that there is a layer of colored material 324 deposited on, or otherwise adjacent to, the cover glass layer 322. The colored material layer includes an opening 326 that is larger than the size of the opening of the pinhole aperture 328, in order to allow for some small deviations of the position of the aperture relative to the cover glass. As illustrated, the pinhole aperture 328 can be positioned adjacent the opening 326 in the colored material layer, and the pinhole aperture can be painted, on at least the partially visibly exposed surface, to match the colored material layer, such that the opening in the pinhole aperture appears as a small opening (e.g., 0.25 mm-2.0 mm) in the colored material layer. A lens 330 of the camera can be positioned adjacent the pinhole aperture 330, and a camera sensor 332 positioned opposite the lens 330 from the aperture 328, in order to enable the camera sensor to capture light passing through the cover glass 322, the opening 326 in the colored material layer, the opening in the pinhole aperture 328, and the camera lens.

As illustrated in FIG. 3(c), the pinhole aperture 340 in at least some embodiments can take the form of a disc 340 machined from a thin layer of a material such as plastic, a ceramic, or machined metal. At least one side of the disc can be painted, tinted, or otherwise colored to match the color of the colored layer of the cover glass. As discussed, while the aperture can be attached to the cover glass in at least some embodiments, in various embodiments the aperture is inserted into a camera cylinder, lens train, or other set of elements associated with the camera, in order to provide for sufficiently adequate alignment with the camera sensor and lens, as offset apertures can negatively impact the quality of images captured by a camera. In other embodiments, the pinhole aperture can be provided by a pinhole lens, where the lens includes an optical element such as a lens with at least one desired optical parameter, where the aperture is located on the front of the lens, as may be painted on, printed on, formed by a separate element, etc. Such a pinhole lens can be a multi-element glass or plastic lens, or combination thereof, with the aperture, also known as the "stop," located at a front or other location of the of the lens.

Figure 3D:
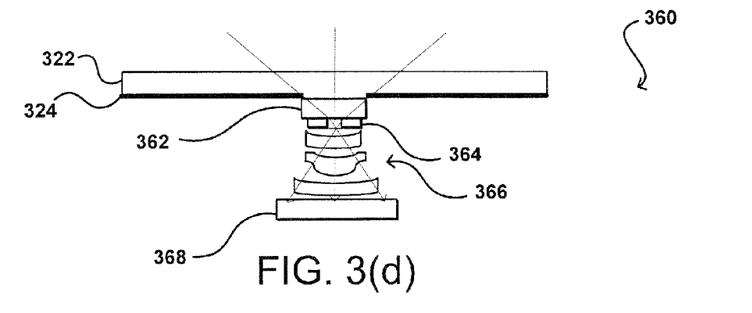

In some embodiments, the aperture can be placed at other locations relative to the camera. For example, in the view 360 of FIG. 3(d) the camera includes a lens train 366 including multiple optical elements. Reference numbers for similar elements are carried over between figures for purposes of explanation, but such use should not be construed as limiting the various embodiments. The aperture 364 can be positioned behind the first lens 362, instead of in front on the lens (from the perspective of incoming light). Where the first lens element 362 is a wide-angle lens, such an approach enables the camera to capture images over a wide range of angles, while still hiding at least a portion of the camera behind the aperture. The use of a wide angle lens in front of the aperture, however, will effectively magnify the apparent size of the aperture to a user, which thus can impact the aesthetics of the design. The size of the camera and the lenses can be reduced with respect to conventional elements, however, such that at least some aesthetic benefit can still be obtained. In some embodiments, a lens train can include three optical elements, such as molded plastic elements with aspheric surfaces. The elements can be designed to work behind cover glass or a front window of a particular material and/or thickness. In some embodiments the elements of the lens train are held by a plastic housing, and the aperture could be formed of the same plastic as the housing. The elements of the lens train can be selected and/or designed to work with cover glass or display glass elements, for example, which typically range on the order of about 0.5 mm to about 1.5 mm, although other sizes can be used as well in various embodiments.

Figure 4:
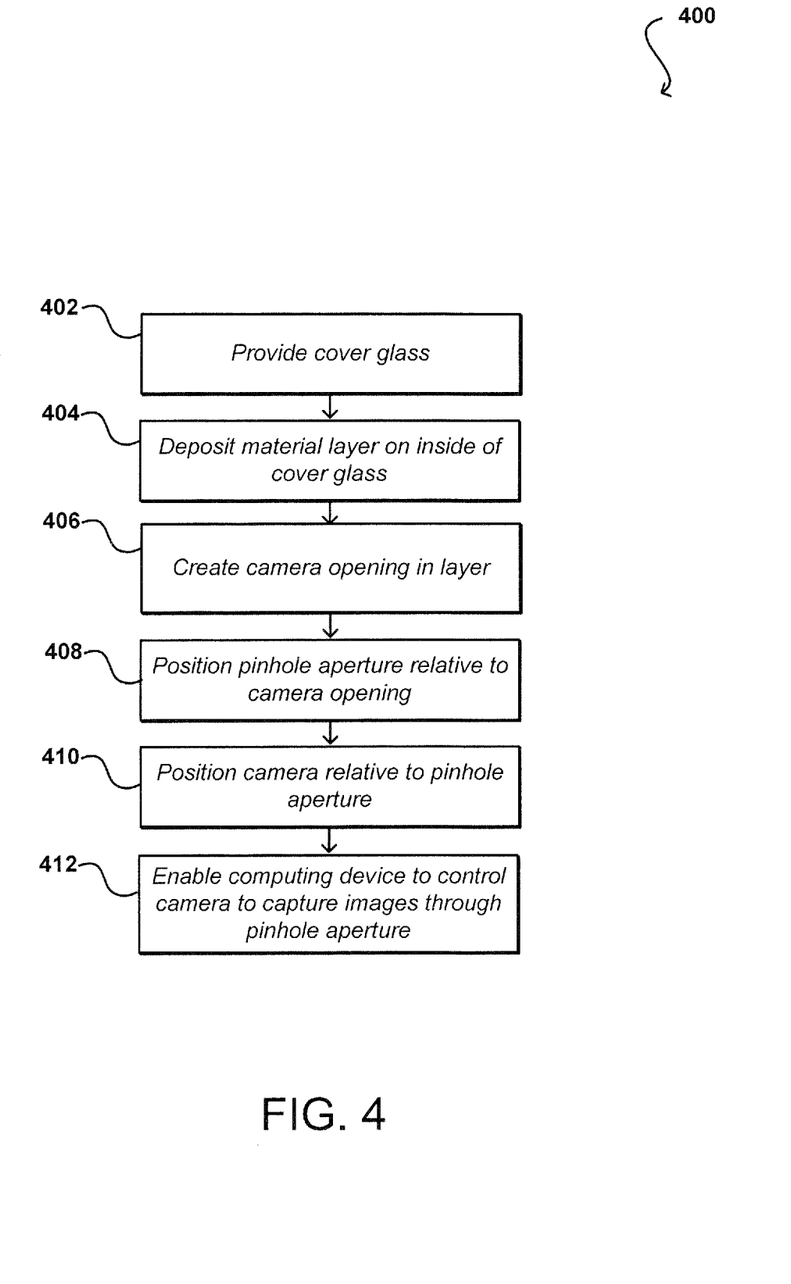
FIG. 4 illustrates an example process for determining an input to a computing device that can be used in accordance with various embodiments.

FIG. 4 illustrates an example process 400 for providing a front pinhole aperture camera in a display window region that can be utilized in accordance with various embodiments. It should be understood that there can be additional, fewer, or alternative steps performed in similar or alternative orders, or in parallel, within the scope of the various embodiments unless otherwise stated. In this example, a cover glass or similar window element is provided 402. A material layer of a determined color is deposited 404 on at least a portion of an "inner" surface (from a device perspective) of the cover glass. As discussed, this can include painting, printing, sputtering, or vapor depositing a layer of colored material on a surface of the cover glass. At least one camera opening can be formed 406 in the deposited layer. The opening can be formed using any appropriate mechanism, such as chemical etching, laser ablation, and the like. A pinhole aperture can be positioned 408 relative to the camera opening and a camera can be positioned 410 relative to the aperture, either in separate or the same steps depending upon the configuration of the aperture. For example, the aperture may be placed in a camera housing that is then positioned relative to a display window, or the aperture may be attached to the window before the display window is attached to the computing device that contains the camera. Various other approaches can be utilized as well, as known for device assembly. Once the components are arranged, the computing device can be enabled 412 to control the camera in order to capture images of light transmitted through the pinhole aperture. As known for camera operation, this can include at least connecting the camera to a processor and memory storage using an appropriate bus or other such connection.

In some embodiments, a device might include multiple types of camera, and only one or more of these cameras might include a pinhole aperture. For example, a camera might include at least one high resolution camera used to perform conventional image capture. For such cameras, a conventional design approach might be used. For cameras used for purposes such as gesture detection or motion tracking, for example, these cameras (which can be lower resolution) might utilize a pinhole aperture in order to blend more seamlessly into the design of the device. Further, while a device designer might want to bring the main camera to a user's attention, and thus expose the main camera, a designer might want to hide secondary cameras or other such components to the extent possible.

In some embodiments, the design might intend to hide all cameras to the extent possible, at least until those cameras are needed for certain purposes. For example, in the design of FIG. 2 both front-facing cameras are behind the cover glass. In situations where the cameras are being used for gesture detection, for example, the user does not necessarily need to know where the cameras are, and thus the pinhole aperture can hide the cameras to the extent possible. When those cameras are to be used for purposes such as videoconferencing or profile picture capture, for example, the user might want to know where the cameras are so the user can look towards the cameras. In those cases, the device might provide an indication where the cameras are located, such as by displaying one or more arrows, guides, partial concentric circles around the cameras, etc. In this way, attention can be drawn toward the camera when desired, but otherwise the cameras can be hidden in the design to the extent possible. A further advantage of placing the cameras behind the glass is that the user will appear to be looking at another user during a video conference or video chat, and not away from the user when the user is looking at a camera away from the display of the device. Another advantage of placing the cameras near the display instead of near the edges of the device is that the user will be less likely to obstruct the cameras when holding the device in a user's hand.

Figure 5:
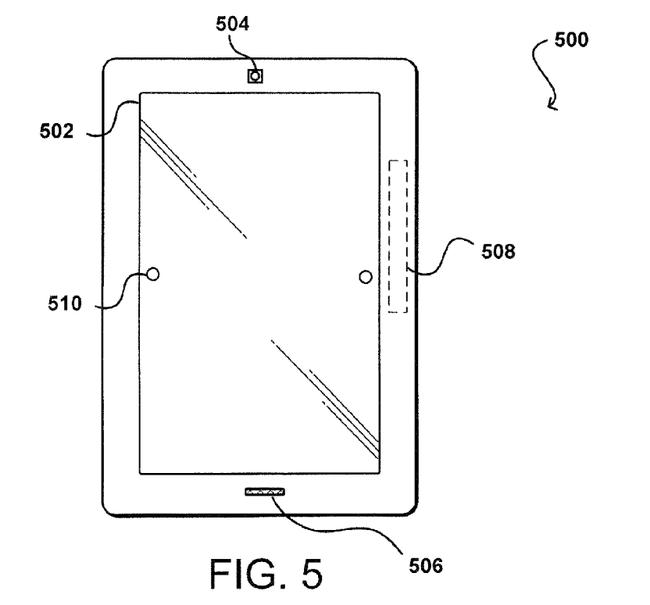
FIG. 5 illustrates an example device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 on the front side, which under normal operation will display information to a user facing the display screen (e.g., on the same side of the computing device as the display screen). The computing device in this example includes at least one camera 504 or other imaging element for capturing still or video image information over at least a field of view of the at least one camera. The example device also includes two gesture sensors 510 located behind a cover window of the display screen 502, but outside the active pixel area. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 500 also includes at least one microphone 506 or other audio capture device capable of capturing audio data, such as words or commands spoken by a user of the device, music playing near the device, etc. In this example, a microphone 506 is placed on the same side of the device as the display screen 502, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 500 also includes at least one orientation sensor 508, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. An orientation sensor can detect motion of the device, which can be used to activate a gesture sensor or motion camera in at least some embodiments, or to account for motion in order to assist in interpreting a motion or gesture performed by a user. As should be understood, the algorithms or mechanisms used for determining relative position, orientation, and/or movement can depend at least in part upon the selection of elements available to the device. In some embodiments, a device can start analyzing image information when movement of the device is detected using one of these sensors. In other embodiments, a user can provide input to the device by tilting the device, shaking the device, or performing another such motion or action.

Figure 6:
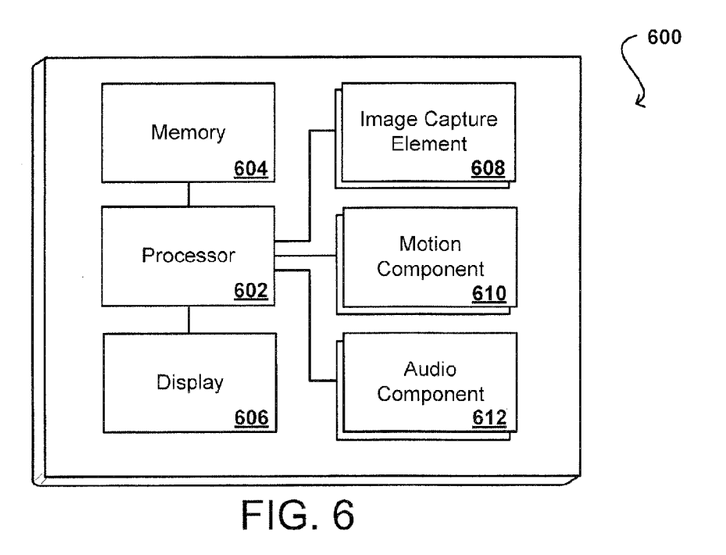
FIG. 6 illustrates example components of a client device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one media capture element 608 such as a camera or infrared sensor that is able to image projected images or other objects in the vicinity of the device, or an audio capture element able to capture sound near the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 600 of FIG. 6 can include one or more communication components 610, such as a Wi-Fi, Bluetooth, RF, wired, or wireless communication system. The device in many embodiments can communicate with a network, such as the Internet, and may be able to communicate with other such devices. In some embodiments the device can include at least one additional input element 612 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 7:
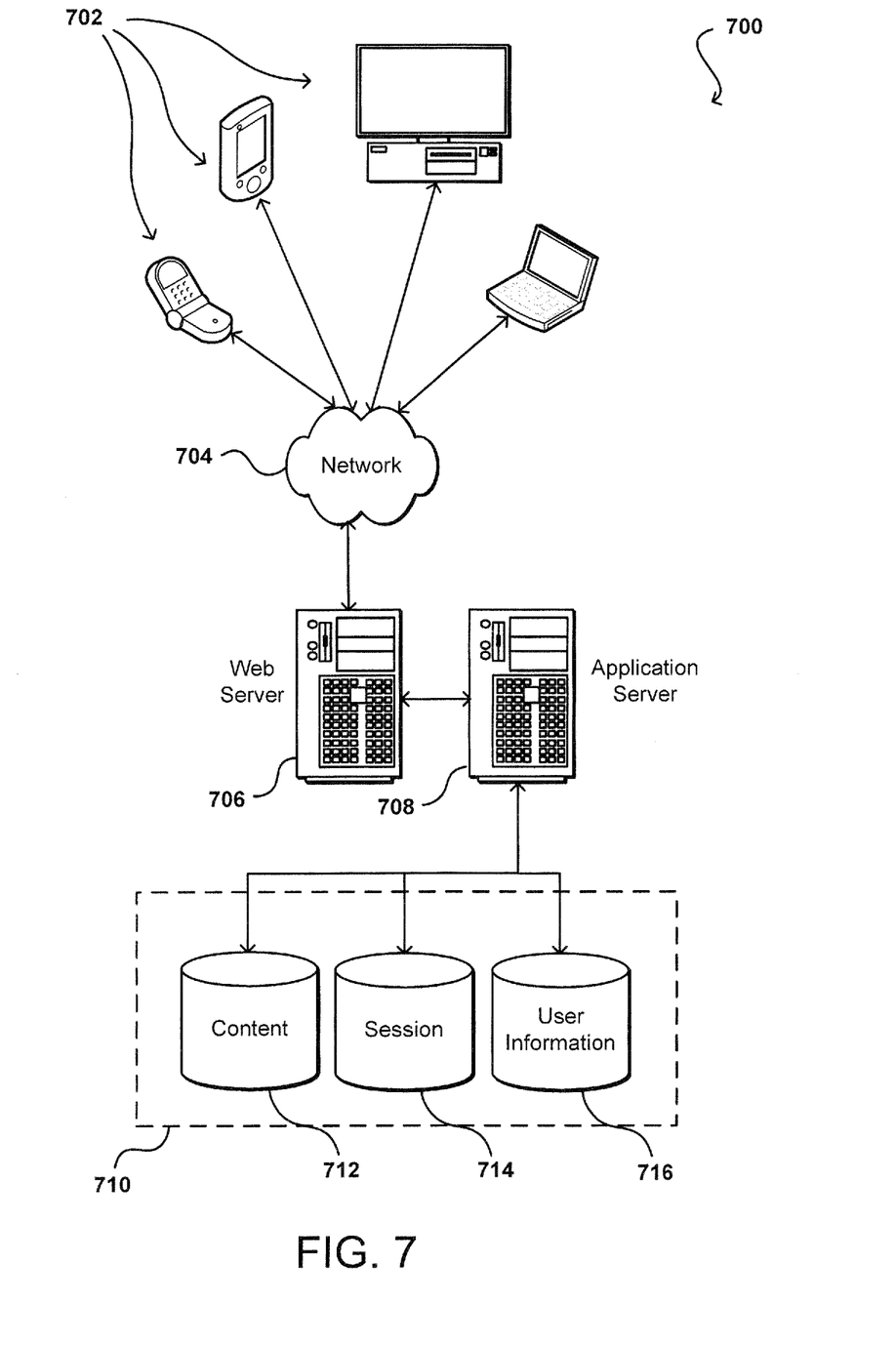
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 702. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a processor;
a display including an active pixel area and a cover element overlying the active pixel area, at least a portion of the cover element extending beyond a perimeter of the active pixel area, an inner surface within the at least one portion of the cover element attached to a layer of material, the layer of material having a specified color and at least one opening;
memory including instructions that are executable by the processor to cause information to be displayed via the active pixel area;
an aperture positioned between a camera and the cover element, the aperture having substantially the same color as the specified color of the layer of material such that an opening in the aperture appears smaller; and the camera positioned with respect to the aperture such that the camera captures light passing through the cover element, the at least one opening of the layer of material and the opening in the aperture.

2. The computing device of claim 1, wherein the aperture has a diameter smaller than at least one of a corresponding opening in the layer of material or a lens of the camera.

3. The computing device of claim 1, wherein the camera includes a camera sensor and at least one camera lens, and wherein the aperture is positioned between the at least one camera lens and the cover element.

4. The computing device of claim 1, wherein the aperture comprises a disc with a pinhole opening, the disc being placed in a camera assembly including the camera.

5. The computing device of claim 4, wherein the disc is formed from a plastic member, a ceramic member, or a metal member.

6. The computing device of claim 1, further comprising:
a second camera positioned with respect to the cover element and including a second aperture.

7. An electronic device, comprising:
an active display element;
a cover glass overlying the active display element;
a camera positioned under the cover glass and configured to capture light passing through a portion of the cover glass, at least a portion of the cover element extending beyond a perimeter of the active pixel area, an inner surface within the at least one portion of the cover glass attached to a layer of material, the layer of material having a specified color and at least one opening; and
an aperture between the camera and the cover glass, an opening of the aperture having a diameter smaller than at least one of a corresponding opening in the layer of material or a lens of the camera.

8. The electronic device of claim 7, wherein the camera is configured to capture light passing through the at least one opening of the layer of material, and wherein the aperture has substantially the same color as the specified color of the layer of material such that an opening in the aperture appears smaller.

9. The electronic device of claim 8, wherein the layer of material comprises a material deposited on an inner surface of the cover glass.

10. The electronic device of claim 7, wherein the camera includes a camera sensor and lens train, and wherein the aperture is located between the lens train and the cover glass.

11. The computing device of claim 10, wherein the lens train comprises three optical elements with aspheric surfaces.

12. The computing device of claim 10, wherein lens train is included in a lens housing.

13. The computing device of claim 12, wherein the aperture is formed from a portion of the lens housing.

14. The computing device of claim 12, wherein the aperture comprises a disc inserted into the lens housing.

15. The electronic device of claim 7, wherein the cover glass extends to at least one edge of the electronic device.

16. The electronic device of claim 7, wherein the opening of the aperture has a diameter in the range of from about 0.25 mm to about 2.0 mm.

17. The electronic device of claim 7, wherein the aperture is formed on a surface of an optical lens used with the camera.

18. The electronic device of claim 7, wherein the active display element is configured to display an indicator of a location of the camera in response to an action on the electronic device requires a user to look at the camera.

19. The electronic device of claim 7, wherein the active display element includes one of a liquid crystal display (LCD) or organic light emitting diode (OLED) display element.

20. The electronic device of claim 7, wherein the layer of material is formed on the inner surface of the cover glass by depositing one of a paint layer or coating on the inner surface.

21. The electronic device of claim 20, wherein opening in the at least one opening in the layer of material is formed at least in part by at least one of using a masking element or removing a portion of the paint layer or coating.

\* \* \* \* \*